Oct. 28, 1952 — R. CLIBORN — 2,615,533
SELF-LUBRICATED TURBINE DRIVE AND GEAR REDUCTION UNIT
Filed Feb. 15, 1949 — 2 SHEETS—SHEET 1
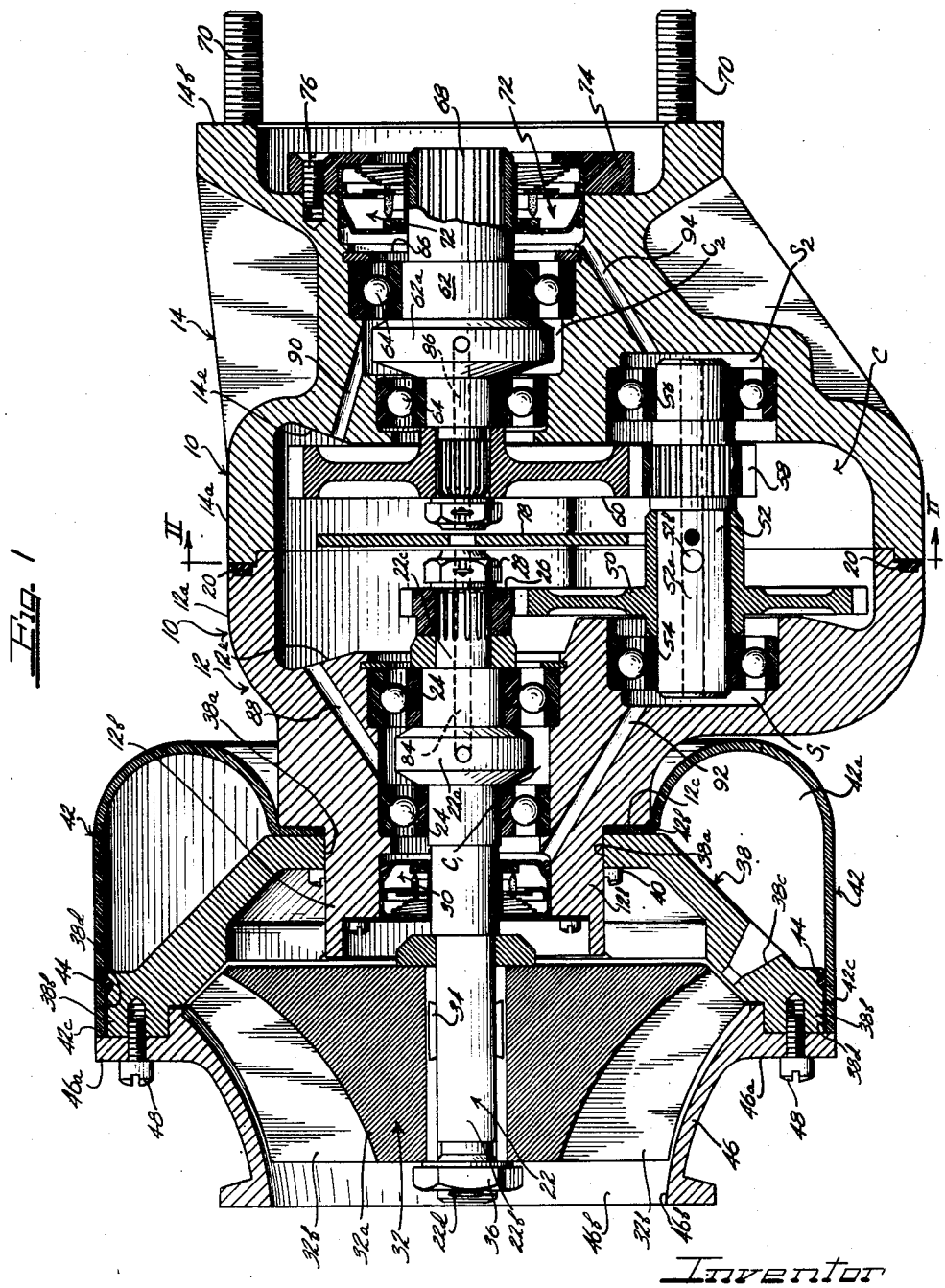
Inventor
ROBERT CLIBORN Oct. 28, 1952 — R. CLIBORN — 2,615,533
SELF-LUBRICATED TURBINE DRIVE AND GEAR REDUCTION UNIT
Filed Feb. 15, 1949 — 2 SHEETS—SHEET 2

Inventor
ROBERT CLIBORN

Patented Oct. 28, 1952

2,615,533

UNITED STATES PATENT OFFICE 2,615,533

SELF-LUBRICATED TURBINE DRIVE AND GEAR REDUCTION UNIT

Robert Cliborn, Cleveland, Ohio, assignor to Thompson Products, Inc., Cleveland, Ohio, a corporation of Ohio Application February 15, 1949, Serial No. 76,511

11 Claims. (Cl. 184—11)

1

This invention relates to a drive mechanism, particularly a turbine drive with a self-contained and lubricated gear reduction unit adapted for driving accessories for jet engines and the like.

With the adoption of jet engines for aircraft propulsion, a demand has arisen for lightweight, turbine driven engine accessories, such as fuel pumps and oil pumps. It has been found to be most advantageous to have such accessories driven by pressured air passing through the engine at a point in advance of the fuel combustion chamber.

In a turbine driving unit for an engine accessory, such as a fuel pump driving unit described specifically herein, it is necessary that the high rotary speed be reduced within the driving unit, in order to attain conventional operation of the accessory.

In accordance with the features of this invention, a gear reduction unit is provided within the turbine drive housing, the entire assembly being self-lubricated. The gears furnish the necessary lubricant pumping action, an action similar to that in gear pumps, wherein the lubricant is thrown by the gears against a baffle plate as well as against the inner walls of the casing. The lubricant which is collected by the baffle plate drains to a feed position on the baffle plate adjacent central apertures in the turbine and drive shafts. The centrifugal force encountered in the rotating shafts pumps the lubricant through the shafts and radially outward through ports in collars or bossed portions on the shafts to lubricate anti-friction bearings located adjacent the collars. There are drain channels located in the housing to drain the lubricant from the bearing chambers of the housing back into the gear chamber of the housing wherein the initial pumping of the oil or other lubricant is repeated. Sealing units are also provided near the ends of the casing to seal the drive shaft and casing from leakage of the lubricant.

Accordingly, it is an object of this invention to provide an improved turbine driving mechanism adaptable for driving engine accessories which are incorporated in jet engines or the like.

Another object of this invention is to provide an improved turbine construction of unusual simplicity and which is entirely self lubricated.

A particular object of this invention is to provide a gear reduction unit for a turbine driving mechanism.

Another object of this invention is to provide a turbine driving unit and a gear reduction unit which are self-lubricated within the same housing.

2

A further object of this invention is to provide a gear reduction unit which is self-lubricated without the incorporation of a lubricant pump.

The specific nature of the invention, as well as other objects and advantages thereof, will become apparent to those skilled in the art from the following detail description of the annexed sheets of drawings which, by way of preferred example only, illustrate one specific embodiment of this invention.

On the drawings:

Figure 1 is a longitudinal cross-section view, with parts in elevation, of a turbine drive and gear reduction unit constructed in accordance with this invention;

As shown on the drawings:

Figure 3:
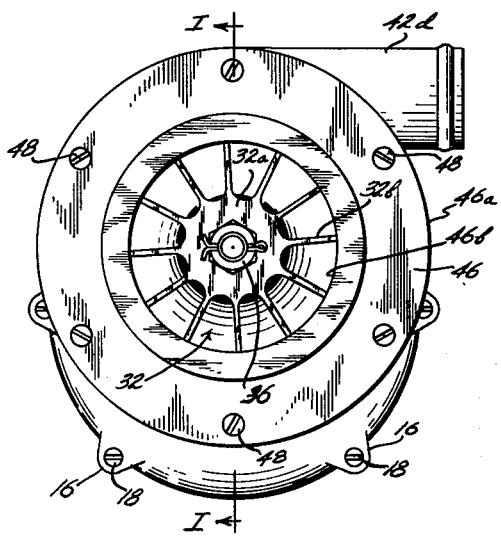
Figure 3 is an end elevational view of the turbine end or left-hand end of the unit of Figure 1 with the line I—I thereon to indicate the direction of the view of Figure 1.

Both the turbine and gear reduction elements of the combined unit embodying this invention are mounted in and supported by a generally tubular casing 10 which comprises two castings or forgings 12 and 14 as best seen with reference to Figure 1. One end portion of each of the castings 12 and 14 is radially enlarged as indicated at 12a and 14a, respectively, and the ends of the enlarged portions are machined for securing the castings 12 and 14 to each other. The securement is attained by providing radially extending ears or lugs 16 (Figure 2) in spaced relation about the outer periphery of the enlarged portions 12a and 14a, the ears having central apertures for accommodating bolts 18 which may be used to bring the castings 12 and 14 into secured relationship. An O-ring 20 is located within a groove in the machined face of the casting 12 and is deformed upon pressure from the casting 14 to form a seal against fluid leakage at the joinder of the casting.

A turbine shaft 22 is suitably journaled within the casting 12 as by a pair of anti-friction bearing units 24 disposed in chamber $C_1$ of the casting 12 and having inner race rings bottomed against opposite sides of a collar portion 22a of the shaft 22. One end 22b of the shaft 22 is of reduced diameter and projects out of the end of the casting 12. The other end 22c of the shaft 22 is likewise of reduced diameter and is splined to mount thereon a gear 26 which is secured in place over the splined portion of the shaft 22 as by the nut 28 threaded to the end of the shaft 22 nearest the casting 14.

To prevent fluid leakage along the bore of the casting 12 or the surface of the shaft 22, a seal unit 30 is mounted intermediate the left-hand anti-friction unit 24 and the left-hand end of the casting 12.

To drive the shaft 22, a turbine rotor 32 is secured on the projecting end portion 22b of shaft 22 in any conventional fashion, such as by a key 34 and a nut 36 threaded on a threaded end portion 22d of the shaft 22. The turbine rotor 32 is of integral construction and embodies a hub portion 32a of generally frusto-conical configuration, decreasing in diameter in an outward direction, and a plurality of circumferentially spaced, radially extending vanes or blades 32b. The outer peripheral surfaces of the vanes 32b are likewise of generally frusto-conical configuration but the effective taper of the outer periheral surfaces is substantially less than the taper of the root surfaces. Accordingly, the effective space or volume between any two adjacent vanes increases substantially in an axially outward direction, although the external periphery of rotor 32 is concurrently decreasing in diameter.

To supply pressured fluid to the turbine rotor 32 so as to effect its rotation, nozzle ring member 38 is provided which is of generally annular configuration and has a central recess 38a suitably proportioned to permit the nozzle member 38 to be slipped over the reduced diameter end portion 12b of casting 12 and secured to the radial flange 12c thereof in any conventional fashion as by bolts 40. The nozzle ring 38 is also of generally frusto-conical configuration and the large diameter end portion 38b thereof extends axially beyond the end of casting 12 and overlies the large diameter portion of the turbine rotor 32.

Nozzle ring 38 is provided with a plurality of circumferentially spaced nozzle apertures 38c which have their discharge openings arranged immediately adjacent the end face of the turbine rotor blades 32b. To supply pressured fluid concurrently to all of the nozzle apertures 38c, an annular shroud 42 is provided and is arranged to cooperate with the rear face, or inlet face of the nozzle ring 38 to define a generally toroidal inlet chamber 42a therewith. The shroud member 42 may be secured to the assembly by having its radially innermost edge 42b clamped between the nozzle ring 38 and the casing flange 12c by the bolts 40 and its outermost edge 42c secured to a cylindrical face 38d of the nozzle ring 38 by suitable means not shown. An O-ring seal 44 is positioned in a groove in the cylindrical face 38d to be deformed when the shroud 42 is placed therearound and in such deformed condition seals the cylindrical face 38d and the inner surface of the outermost edge 42c of the shroud 42 from leakage of fluid from within the shroud inlet chamber 42a.

As is best shown in Figure 3, the shroud member 42 is provided with an integrally formed tangentially disposed inlet conduit 42d which communicates with a suitable source of pressured fluid. This source of pressured fluid may be obtained by connecting a conduit with the tangential inlet 42d of the shroud member 42, the conduit having its mouth portion disposed in the air stream through the jet casing or the external casing of the jet engine. The disposition of the conduit to the tangential inlet 42d should be such that it will bleed off a portion of the air passing through the engine casing to supply the turbine rotor 32.

A second shroud member 46 of annular configuration is provided to closely surround the frusto-conical periphery of the turbine blades 32b. The shroud member 46 is provided with an integral, radially projecting flange 46a by which it may be conveniently secured to the front face of the nozzle ring 38 by a plurality of bolts 48. The smaller diameter portion 46b of the shroud ring 46 provides exhaust passage for the pressured fluid which drives the turbine rotor 32.

From the foregoing description, it is apparent that when pressured fluid is supplied to the tangential inlet conduit 42d of the shroud member 42, the pressured fluid will be supplied through the nozzle 38c to the blades 32b of the turbine rotor 32 and effect a driving of the turbine rotor 32 and hence the shaft 22. Rotation of the turbine rotor 32 and of the shaft 22 may be at a rate far in excess of that desired in driving an engine accessory, such as a fuel pump, and in accordance with this invention, a gear reduction unit is incorporated to diminish the rotary speed of the drive shaft to the engine accessory.

As previously mentioned, the gear 26 is splined to the innermost end 22c of shaft 22 to rotate therewith. The gear 26 in rotation conventionally meshes a larger diameter gear 50 which is carried by a lower gear shaft 52 journaled respectively at its left-hand end by the anti-friction bearing unit 54 disposed in sump chamber $S_1$ in the casting 12 adjacent the larger diameter portion 12a and at its right-hand end by an anti-friction bearing unit 56 disposed in sump chamber $S_2$ in the casting 14 adjacent the larger diameter portion 14a. The shaft 52 also accommodates a relatively smaller diameter gear 58 intermediate the gear 50 and bearing unit 56.

The gear 58 conventionally meshes with a relatively larger diameter gear 60 which is splined to an accessory drive shaft 62. The drive shaft 62 is journaled within chamber $C_2$ of the casting 14 as by conventional anti-friction bearing units 64 which are located on opposite sides of a collar or boss portion 62a of the shaft 62. The bearing units 64 are retained within the casting 14 as by a split ring retaining ring 66. The outermost or right-hand end of the shaft 62 is internally splined as indicated at 68 for driving connection to an engine accessory which may be secured to the outermost or right-hand face 14b of casting 14 as by the embedded bolts 70. A sealing unit 72 is located about the internally splined end 68 of the shaft 62 to seal the surface of the internal bore of the casting 14 and the external surface of the drive shaft 62 from leakage of fluid. The sealing unit 72 is retained within the cavity of the casting 14 by a retaining ring 74 which is secured to the casting 14 as by screws 76.

From the foregoing description, it is apparent that when the turbine shaft 22 rotates the small gear 26 thereon, the larger gear 50 meshed therewith will drive the lower gear shaft 52 at a reduced speed determined by the relative sizes of the gears. The driven shaft 52 then drives the small gear 58 which is meshed with the relatively larger diameter gear 60 to drive the drive shaft 62 at a still slower speed. As illustrated, the overall reduction in rotary speed between the turbine shaft 22 and the drive shaft 62 is approximately 10.35:1 as would be desired for example in operation of a fuel pump.

As shown in Figure 1 the castings 12 and 14 cooperate to form a chamber C receiving the gears and this chamber is charged with oil which is thrown by the gears against the walls of the chamber and especially against the inner walls of the radially enlarged portions 12a and 14a of the castings 12 and 14. A baffle plate 78 is provided within the chamber C and is located intermediate the inner ends of the shafts 22 and 62.

Figure 2:
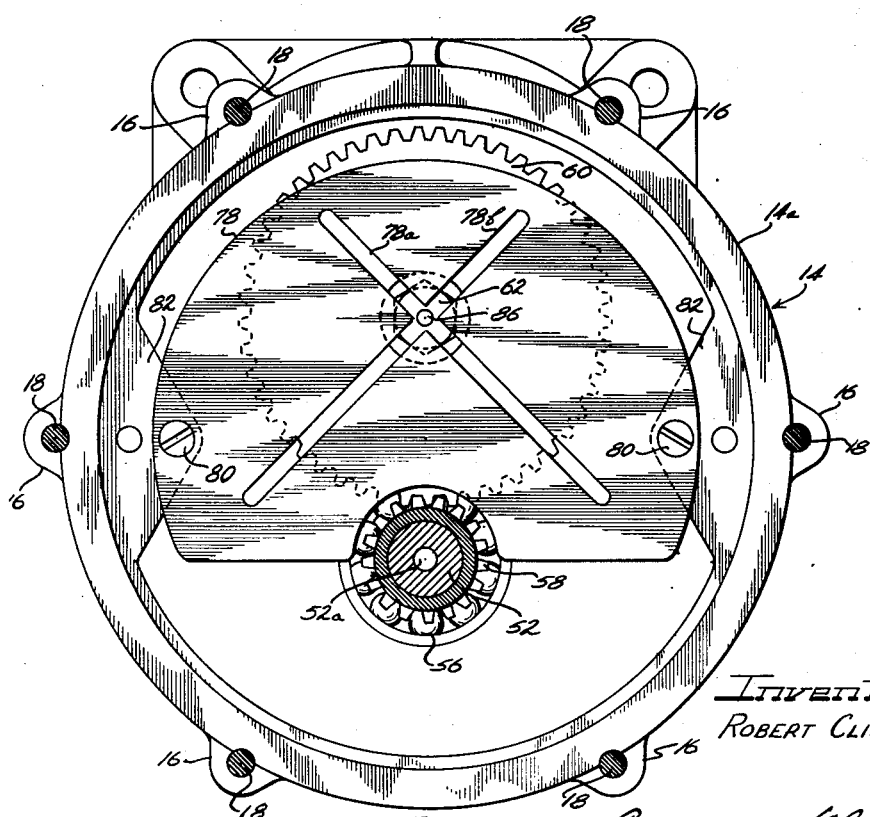
Figure 2 is a transverse sectional view taken substantially as indicated by the line II—II of Figure 1.

As shown in Figure 2, the baffle plate 78 is secured as by screws 80 to radially inwardly directed projections 82 on the inner wall of the casting portion 14a of casting 14. The projections 82 besides affording securing means for the baffle plate 78 also deflect oil particles thrown off by the gears towards the oil baffle plate 78.

The baffle 78 is equipped with inclined crossed slots 78a and 78b intersecting at a point aligned with the ends of the shafts 22 and 62. Oil on the baffle 78 drains to these slots and tend to flow therein to the intersection and thus be directed towards the ends of the shafts 22 and 62.

As shown in Figure 1 the shafts 22 and 62 have central bores or channels 84 and 86, respectively. These channels extend into the shafts from the inner ends thereof to the collars 22a and 62a thereof where they intersect with radial channel portions which open through the periphery of the collars. Centrifugal force in the radially extending channel portions induces a flow of oil from the baffle at the point of intersection of the slots 78a and 78b through the channels 84 and 86 to be radially sprayed at the outlets in the collars 22a and 62a. Some of the oil in the chamber C is thus drawn into chambers C1 and C2 surrounding the collars 22a and 62a respectively to lubricate the bearing units 24 and 64 which respectively journal the shafts 22 and 62.

A further source of lubrication for the aforementioned bearing units 24 and 64 is provided by means of a pair of drain passages 88 and 90 respectively located in the castings 12 and 14. These passages have their inlets on inclined surfaces 12e and 14e, respectively, the surfaces 12e and 14e being inclined to collect oil thrown to the top of the chamber C.

The chambers C1 and C2 are drained by the passages 92 and 94, respectively, the oil flowing through the passages 92 and 94 into lower sump the chambers S1 and S2 containing the lower bearings 54 and 56, respectively. The lower gear shaft 52 has an axial passage 52a therethrough and a central radially directed communicating passage 52b. Centrifugal force caused by rotation of the gear shaft 52 draws oil through the passage 52a to be radially discharged through the passage 52b. The oil is thus fed back to the central chamber C where it is again in position to be pumped by the gears.

From the foregoing description it is obvious that the lubricant is pumped throughout a continuous cycle during operation of the turbine to lubricate the bearings of the turbine shaft, the drive shaft and the gear shaft. In order that the cycle of lubrication be continued without leakage of oil or lubricant, the shaft sealing units 30 and 72 are provided to seal the turbine shaft 22 and the drive shaft 62, respectively.

Figure 4:
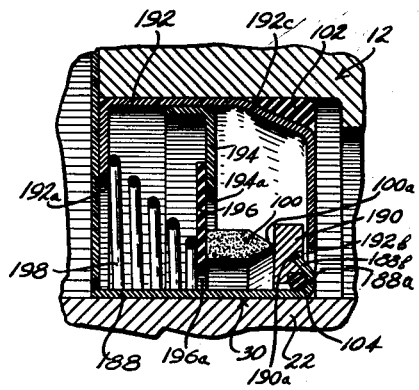
Figure 4 is an enlarged sectional view showing the oil seal incorporated in the unit for sealing the shafts and casing.

The sealing units 30 and 72 are of duplicate construction and arrangement and with reference to Figure 4 wherein only seal 30 is illustrated it is to be understood that the construction and operation of the seal 72 is the same.

A sheet metal sleeve 188 is press-fitted over that portion of the shaft 22 where the sealing unit 30 is located. The sleeve 188 has a radially outward flange projection 188a by which ring 190 is driven. The flange 188a and the ring 190 may be connected by welding or by seating a driving lug 188b on the flange 188a into a slot 190a in the ring 190. An outer shroud 192 of generally annular configuration which has an aperture 192a of comparatively larger diameter at its one end and an aperture 192b of comparatively smaller diameter at its other end is secured in the bore of the casting portion 12b so as to shroud the sleeve 188. The casing 192 has an internal transverse wall member 194 welded thereto which is centrally apertured at 194a. A diaphragm 196 with a central opening 196a acts against the outer surface of the wall 194 being biased by a compression spring 198 which rests against the inner wall of the casing 192 adjacent the large diameter opening 192a. A graphite impregnated ring 100 is attached to the diaphragm 196 on the side opposite the compression spring 198. The ring 100 has a knife-like edge on its opposite face which acts against the ring 190 forming a seal between the ring 100 and the ring 190. A synthetic rubber ring 102 is placed about the casing 192 and is deformed to seal against the tapered surface 192c thereof and the inner surface of the bore of the casting 12. Another synthetic rubber ring 104 of relatively lesser diameter is secured for sealing between the sleeve 188 and the ring 100. The sealing of the shaft 22 and casting 12 is thus completed by the incorporation of the two rings 102 and 104 and the sealing unit 30. Oil may enter the sealing unit 30 through the aperture 192b but is sealed within the confines of the rubber diaphragm 196 and the casing 192 by the action of the spring-biased graphite impregnated ring 100 against the rotating metal ring 190.

It is, therefore, apparent that the turbine drive and gear reduction units embodying this invention are self-lubricated and sealed and may be advantageously applied to jet engine accessories wherein the overall dimensions and the weight of the unit must be maintained at a minimum.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A turbine drive unit adapted for jet engines comprising opposed casings cooperating to define a gear chamber and upper and lower bearing chambers on each side of the gear chamber, an upper shaft extending through the upper bearing chamber of each casing, said upper shafts having opposed terminal ends in the gear chamber, a lower shaft spanning the gear chamber and extending into the lower bearing chambers, bearings in each bearing chamber rotatably supporting the shafts, gears in the gear chamber connecting the upper and lower shafts, said upper shafts having passages connecting said terminal ends thereof with the upper bearing chambers to induce flow of lubricant from the gear chamber into the upper bearing chambers, each of said casings having a drain passage connecting the gear chamber to said upper bearing chambers thereof to feed lubricant to the upper bearing chambers, each of said casings having a drain passage connecting the upper and lower bearing chambers thereof to feed lubricant to the lower chambers, said lower shaft having a passage joining the lower bearing chambers with the gear chamber and arranged to induce flow of lubricant to the gear chamber, baffle means in the gear chamber extending between the upper shafts and arranged to direct lubricant into the passages of the upper shafts, a turbine housing on one casing, and a turbine rotor in said housing on one upper shaft to drive the shaft for rotating the gears in the gear chamber and thereby drive the other shafts while splashing lubricant on the baffle.

2. A gear reduction and drive unit comprising opposed casings cooperating to define a gear chamber intermediate a plurality of vertically spaced bearing chambers, a drive shaft extending through one of said bearing chambers on one of said casings, a shaft extending through a bearing chamber on the other of said casings, the innermost ends of said shafts being disposed in said gear chamber, a shaft spanning said gear chamber and extending into a bearing chamber of each of said casings, gears in said gear chamber connecting the shafts in driving relation, said gears being arranged to splash lubricant in said gear chamber, bearings in each bearing chamber rotatably supporting the shafts, each of said casings having drain passages connecting the gear chamber and the bearing chambers, means including each of said shafts defining communicating axial and radial flow passages connecting the gear chamber to their respective bearing chambers, whereby lubricant is induced to flow from said gear chamber through said bearing chambers back to said gear chamber, and sealing means to seal the lubricant in said casings.

3. A gear reduction and drive unit comprising opposed casings cooperating to define a gear chamber intermediate a plurality of vertically spaced bearing chambers, a drive shaft extending through one of said bearing chambers on one of said casings, an opposing shaft extending through a bearing chamber on the other of said casings, the innermost ends of said shafts being disposed in said gear chamber, a shaft spanning said gear chamber and extending into a bearing chamber of each of said casings, gears in said gear chamber connecting the shafts in driving relation, said gears being arranged to splash lubricant in said gear chamber, bearings in each bearing chamber rotatably supporting the shafts, each of said shafts having passages connecting the gear chamber to their respective bearing chambers to induce the flow of lubricant, means for directing the flow of lubricant toward the passages of said drive shaft and said opposing shaft whereby lubricant is induced to flow from said gear chamber through said bearing chambers back to said gear chamber, and sealing means to seal the lubricant in said casings.

4. A gear reduction and drive unit comprising opposed casings cooperating to define a gear chamber intermediate a plurality of vertically spaced bearing chambers, a drive shaft extending through one of said bearing chambers on one of said casings, an opposing shaft extending through a bearing chamber on the other of said casings, the innermost ends of said shafts being disposed in said gear chamber, a shaft spanning said gear chamber and extending into a bearing chamber of each of said casings, gears in said gear chamber connecting the shafts in driving relation, said gears being arranged to splash lubricant in said gear chamber, bearings in each bearing chamber rotatably supporting the shafts, each of said shafts having passages connecting the gear chamber to their respective bearing chambers to induce the flow of lubricant, whereby lubricant is induced to flow from said gear chamber through said bearing chambers back to said gear chamber, baffle means in said gear chamber constructed and arranged to direct lubricant to said passages in said drive shaft and said opposing shaft, and sealing means to seal the lubricant in said casings.

5. In a self-lubricated gear drive unit, a casing having a gear chamber adapted to receive a charge of lubricant and a shaft bore extending away from said gear chamber, a bearing means in said shaft bore, a shaft journaled in said bearing means and having an end portion extending into said gear chamber, gear means on said end portion rotatable in said gear chamber, said shaft having a lubricating passage communicating with said bearing means in said shaft bore and opening axially outwardly at the end portion of said shaft, and baffle means in said gear chamber at the end of said shaft to direct lubricant splashed by said gears into said lubricating passage for passage to said bearing means.

6. In a self-lubricated gear drive unit, a casing having a gear chamber adapted to receive a charge of lubricant and a shaft bore extending away from said gear chamber, a bearing means in said shaft bore, a shaft journaled in said bearing means and having an end portion extending into said gear chamber, gear means on said end portion rotatable in said gear chamber, said shaft having a lubricating passage communicating with said bearing means in said shaft bore and opening axially outwardly at the end portion of said shaft, and a baffle plate in said gear chamber having crossed slots formed therein intersecting in alignment with the end of said shaft to direct lubricant into said lubricating passageway for passage to said bearing means.

7. In a self-lubricated gear drive unit, a casing having a gear chamber adapted to receive a charge of lubricant and a shaft bore extending away from said gear chamber, a bearing means in said shaft bore, a shaft journaled in said bearing means and having an end portion extending into said gear chamber, gear means on said portion rotatable in said gear chamber, said shaft having an axially extending lubricating passage opening outwardly at said end portion and a radially extending passage intersecting said axially extending lubricating passage and opening outwardly at said bearing means, and a flow directing means in said gear chamber in alignment with said end portion of said shaft to direct lubricant splashed by said gear means into said axially extending lubricating passageway, said radially extending passage operative to centrifugally induce flow of lubricant from said gear casing to said bearing means.

8. In a gear drive unit, a casing adapted to be charged with lubricant, bearing means in said casing, a pair of opposed coaxially aligned shafts extending into said casing and journaled in said bearing means, reduction gear means interconnecting said shaft for corotation and being rotatable in said casing to splash the lubricant throughout the casing, and a baffle plate in said casing interposed between said shafts, said baffle plate having crossed slots intersecting in alignment with the axial centers of said shafts to direct lubricant splashed on said baffle plate by said reduction gear means to the ends of said shafts, each of said shafts having recesses therein extending from the opposed ends to the bearing means in which each shaft is journaled, thereby to carry lubricant from said slots to said bearing means.

9. In a gear reduction unit, a pair of spaced coaxially aligned shafts each having an axially extending lubricating passage opening toward the opposed ends thereof, a casing adapted to be charged with a lubricant and having spaced apart bearing means arranged to journal said shafts with the opposite ends of the shafts extending into said casing, said bearing means being in communication with said lubricating passages, reduction gear means rotatable in said casing and interconnecting said shafts for corotation, and baffle means in said casing between the opposed ends of said shafts to direct lubricant splashed by said gear means through said lubricating passages to said bearing means.

10. In a gear reduction unit, a casing adapted to be charged with a supply of lubricant, a plurality of bearings in said casing, a pair of coaxially aligned spaced shafts journaled in said bearings and having opposed ends extending into said casing, a third shaft journaled in said bearings and being in spaced parallel alignment with said pair of shafts, each of said pair of shafts having an axially extending lubricating passage communicating with the corresponding bearings of said plurality of bearings in which each of said shafts is journaled, each of said lubricating passages opening outwardly at said opposed ends of said shafts, reduction gear means rotatable in said casing and interconnecting all of said shafts for corotation at different speeds, baffle means in said casing and being interposed between said opposed ends of said pair of shafts to direct lubricant splashed by said reduction gear means to said lubricating passageways for passage to said corresponding bearings and additional passageways formed in said casing from said corresponding bearings to the bearings of said plurality of bearings journaling said third shaft to carry the lubricant thereto.

11. In a gear reduction unit, a casing having a first bore extending therethrough with an enlarged medial gear chamber adapted to be charged with a supply of lubricant, said casing being additionally recessed to provide a second bore extending on opposite sides of said gear chamber and in spaced parallel alignment to said first bore, a pair of coaxially aligned shafts in said first bore having opposed ends extending into said gear chamber, a first bearing means in one end of said first bore journaling one of said pair of shafts, a second bearing means in the other end of said first bore journaling the other of said pair of shafts, a shaft seal in each end of said first bore to prevent leakage along said pair of shafts, a third shaft in said second bore, a third bearing means in one end of said second bore journaling one end of said third shaft, a fourth bearing means in the other end of said second bore journaling the other end of said third shaft, reduction gear means rotatable in said gear chamber and interconnecting said shafts for corotation, a baffle means in said casing interposed between the opposed ends of said pair of shafts to conduct lubricant splashed by said reduction gear means to the ends of said pair of shafts, each of said pair of shafts having an axially extending lubricating passage from the end thereof to said first and second bearing means, respectively, to carry lubricant thereto, and means in said casing providing lubricating passageways from said first bearing means to said third bearing means and from said second bearing means to said fourth bearing means to carry lubricant thereto.

ROBERT CLIBORN.

REFERENCES CITED

The following references are of record in the file of this patent:

UNITED STATES PATENTS

| Number | Name | Date |
| --- | --- | --- |
| 1,290,626 | Masury | Jan. 7, 1919 |
| 1,493,319 | Brodie | May 6, 1924 |
| 1,628,212 | Winterer | May 10, 1927 |
| 1,974,974 | Puffer | Sept. 25, 1934 |
| 2,406,388 | Larrecq | Aug. 27, 1946 |